UNITED STATES PATENT OFFICE 2,407,615

FIRE-RESISTING COATING AND IMPREGNATING COMPOSITIONS

Cecil Frederic Moon, Cricklewood, London, and Norman Collinson-Jones, Hatch End, England No Drawing. Application October 9, 1944, Serial No. 557,928. In Great Britain September 29, 1943

10 Claims. (Cl. 106—84)

This invention relates to an improved fire-resisting coating and impregnating composition and fire-resisting materials obtained therewith.

The main object of the invention is to provide a fire-resisting composition and fire-resisting material which will overcome the drawbacks encountered with the various fire-resisting compositions and materials hitherto proposed, more particularly cracking and disintegration when subjected to high temperatures, and especially when water is applied to them at such temperatures.

The fire-resisting composition provided according to the present invention may be used, for instance, as an emulsion for impregnation purposes, as a paint providing a protective coating, as a plaster to be applied direct to any surface, or as a board to be used for covering and other purposes.

The invention consists in producing the fire-resisting composition by the thorough admixture of sodium silicate (and water), china clay and/or any of its equivalents as hereinafter referred to, concentrated oil of vitriol (and water), and acetic acid (and water) the oil of vitriol acting as a setting agent and the acetic acid acting as a very powerful suspension agent, which is most essential.

The invention also consists in the ingredients being used in the proportions and within the range of temperatures hereinafter more particularly referred to.

The invention further consists in the mixture being produced in the manner hereinafter more particularly described, and in its being used in the modes hereinafter referred to.

The ranges of the proportions in which the various ingredients are used are as follows:

| | Pounds |
|---|---|
| Sodium silicate | 28 to 40 |
| China clay | 45 to 70 |
| Concentrated oil of vitriol | 1½ to 2¼ |
| Acetic acid | ¾ to 1½ |

The temperature ranges of the ingredients when introduced into the emulsifier are as follows:

| | °F. |
|---|---|
| Sodium silicate | 65 to 70 |
| Concentrated oil of vitriol | 58 to 68 |
| Acetic acid | 60 to 70 |

The following is an example of a standard mixture:

| | |
|---|---|
| Sodium silicate, 140 Twd | 35¼ lbs. |
| Water | 18½ lbs. |
| China clay | 58¾ lbs. |
| Concentrated oil of vitriol | 2 lbs. 1 oz. |
| Water | 8 lbs. |
| Acetic acid 80%' commercial | 1 lb. 4 oz. |
| Water | 3 lbs. 2 oz. |

The method of mixing is as follows:

The sodium silicate and water are thoroughly beaten up at a temperature not exceeding 70° F. in a mixer operated at a speed of 300 to 400 revs. per minute, for about 10 minutes; the china clay is then introduced and thoroughly beaten in for about 5 minutes; thereupon the concentrated oil of vitriol and water are gradually introduced at a temperature not exceeding 68° F. while the mixer is in motion for about 5 to 6 minutes, the mixing continuing until the mass becomes thoroughly mixed; finally the acetic acid and water are introduced at a temperature not exceeding 70° F. and subjected to the same thorough mixing. It is important that the vitriol be introduced after the sodium silicate and the china clay and before the acetic acid so that it should chemically act on the sodium silicate and cause only slight coagulation, the acetic acid which is subsequently introduced acting to complete the coagulation whilst powerfully acting to keep the china clay in suspension. If the acetic acid were introduced before the vitriol coagulation would be far too rapid and a subsequent addition of vitriol would be most ineffective in its action on the sodium silicate.

Instead of, or in addition to, the china clay, one or more of the following substances may be used: pure talc, talc and French chalk, kaolin, asbestine, kalytes, Alusan, the latter two being forms of china clay obtainable under these names in Great Britain.

The emulsified mixture may be used for the impregnation of linen and other textile materials to produce, for instance, fire-resisting suits, gauntlets and other fire-resisting wearing apparel; also covers of air filled dinghies, parachute covers, etc. In the case of this application a substantially reduced amount of china clay is used.

When used as a paint, such as for the protection of timber in buildings, ships and aircraft, roof timbers, wooden huts, inflammable building board, ammunition boxes, and other inflammable structures and articles subject to fire danger, the application of two coatings will generally be sufficient. In the use as a paint, the proportion of the china clay and/or its equivalent is increased by about 25%.

In order to produce a fire-resisting plaster, the emulsified mixture is added to a cellulose base, for example, jute, hemp, sisal, bagasse, straw, etc., in the proportions of 1/3 emulsion to 2/3 cellulose base. The plaster can be applied direct, by ordinary plasterer's technique, to any surface, e. g. wood, brick, metal and even glass, without any deleterious effect to such surface. The material has strong adhesive properties and no additional support, e. g. expanded metal or wire netting is required for ordinary application.

The main uses of such a plaster are: for the treatment of walls, ceilings and floors, which, if required, may then be papered, distempered or painted with water paint; the lining of cold storage rooms; the insulation of gas stoves, refrigerators, etc.; lagging of boilers, steam piping and the like; fireproofing protection of all steel-work in buildings, power stations, gas-works, etc.

The plaster is of light weight and holes can be bored and nails and screws driven into it without damage; it can also be easily sawn. Its thickness may vary from 1/2" to 2" according to requirements.

In the case of fire-resisting boards for covering and other purposes, they may be produced in a thickness of 3/16" and, if necessary for special work, they may be laminated up to four thicknesses. If desired, the boards may be moulded. In this form it can be used in sheets, portable shields and screens.

We claim:

1. A fire-resisting coating and impregnating composition comprising a thorough mixture of sodium silicate (and water); a filler selected from the group consisting of: china clay, pure talc, talc and French chalk, kaolin, asbestine, kalytes, Alusan; a setting agent consisting of concentrated oil of vitriol (and water), and a suspension agent consisting of acetic acid (and water).

2. A fire-resisting coating and impregnating composition comprising a thorough mixture of sodium silicate, a filler consisting of china clay, a setting agent consisting of vitriol (and water), and a suspension agent consisting of acetic acid and in which the various ingredients are used within the following ranges of proportions:

| | Pounds |
|---|---|
| Sodium silicate | 28 to 40 |
| China clay | 45 to 70 |
| Concentrated oil of vitriol | 1½ to 2¼ |
| Acetic acid | ¾ to 1½ |

3. A process of manufacture of fire-resisting coating and impregnating composition as claimed in claim 2, consisting in adding the ingredients while at a temperature falling within the following ranges:

| | °F. |
|---|---|
| Sodium silicate | 65 to 70 |
| Concentrated oil of vitriol | 58 to 68 |
| Acetic acid | 60 to 70 | the china clay being added at the surrounding temperature.

4. A fire-resisting coating and impregnating composition as claimed in claim 1, in which the ingredients, including the water introduced with each one of them are used in the following specific proportions:

| | |
|---|---|
| Sodium silicate, 140 Twd | 35¼ lbs. |
| Water | 18½ lbs. |
| China clay | 58¾ lbs. |
| Concentrated oil of vitriol | 2 lbs. 1 oz. |
| Water | 8 lbs. |
| Acetic acid, 80% commercial | 1 lb. 4 ozs. |
| Water | 3 lbs. 2 oz. |

5. A process of manufacture of fire-resisting coating and impregnating composition as claimed in claim 1, in which the ingredients, including the water introduced with each one of them are used in the following specific proportions:

| | |
|---|---|
| Sodium silicate, 140 Twd | 35¼ lbs. |
| Water | 18½ lbs. |
| China clay | 58¾ lbs. |
| Concentrated oil of vitriol | 2 lbs. 1 oz. |
| Water | 8 lbs. |
| Acetic acid, 80% commercial | 1 lb. 4 oz. |
| Water | 3 lbs. 2 oz. | and in which the temperature of the admixing of sodium silicate and water does not exceed 70° F., that of the concentrated oil of vitriol and water does not exceed 68° F., and that of acetic acid and water does not exceed 70° F.

6. A process of manufacture of fire-resisting coating and impregnating composition as claimed in claim 1, consisting in effecting admixture as follows: the sodium silicate and water are thoroughly beaten in a mixer for about 10 minutes; the china clay is then introduced and thoroughly beaten in for about 5 minutes; thereupon the concentrated oil of vitriol and water are gradually introduced while the mixer is in motion for about 5 to 6 minutes, the mixing continuing until the mass becomes thoroughly mixed; finally the acetic acid and water are introduced and subjected to the same thorough mixing.

7. A painting composition as claimed in claim 2 as set forth.

8. Fire-resisting articles impregnated with a composition as claimed in claim 2 as set forth.

9. Fire-resisting plastering consisting of a composition as claimed in claim 2 added to a cellulose base as set forth.

10. Fire-resisting boards for covering and other purposes including a composition as claimed in claim 2 as set forth.

CECIL FREDERIC MOON.
NORMAN COLLINSON-JONES.